US012096318B2

(12) United States Patent
Qi

(10) Patent No.: US 12,096,318 B2
(45) Date of Patent: Sep. 17, 2024

(54) SYSTEMS AND METHODS FOR IMPLEMENTING AUTONOMOUS VEHICLE COLLABORATION VIA A HYBRID DISTRIBUTED CONNECTED NETWORK

(71) Applicant: GM Global Technology Operations LLC, Detroit, MI (US)

(72) Inventor: Wenyuan Qi, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 326 days.

(21) Appl. No.: 17/690,338

(22) Filed: Mar. 9, 2022

(65) Prior Publication Data

US 2023/0269564 A1 Aug. 24, 2023

(30) Foreign Application Priority Data

Feb. 18, 2022 (CN) .......................... 202210152438.6

(51) Int. Cl.
*H04W 4/40* (2018.01)
*H04L 67/10* (2022.01)
*H04W 4/08* (2009.01)

(52) U.S. Cl.
CPC .............. *H04W 4/40* (2018.02); *H04L 67/10* (2013.01); *H04W 4/08* (2013.01)

(58) Field of Classification Search
CPC .. G05D 1/0088; G05D 1/0214; G05D 1/0276; G05D 1/0287; G05D 1/0291;
(Continued)

(56) References Cited

U.S. PATENT DOCUMENTS

2021/0157314 A1* 5/2021 Wray .................. B60W 60/0011
2021/0312809 A1* 10/2021 Priev ...................... G08G 1/166
2022/0369083 A1* 11/2022 Goel ......................... G08G 1/22

FOREIGN PATENT DOCUMENTS

DE 102018122588 A1 3/2019

OTHER PUBLICATIONS

Norm ETSI TS 102 965 V2.1.1 2021-11-00.—Intelligent transport systems (ITS); application object identifier (ITS-AID); registration; release 2.

* cited by examiner

*Primary Examiner* — Golam Sorowar
(74) *Attorney, Agent, or Firm* — Vivacqua Crane, PLLC

(57) ABSTRACT

A vehicle collaboration system of a first autonomous vehicle includes a transceiver and a collaboration controller. The transceiver is configured to broadcast a first collaboration message including first vehicle data associated with the first autonomous vehicle in connection with a collaboration application to a collaboration domain group via a hybrid distributed-connected network (HYDIN). The collaboration domain group includes at least the first autonomous vehicle and a second autonomous vehicle. The transceiver is configured to receive a second collaboration message including second vehicle data associated with the second autonomous vehicle in connection with the collaboration application via the HYDIN. The second collaboration message is broadcast from the second autonomous vehicle to the collaboration domain group via the HYDIN. The collaboration controller is configured to implement a collaboration action associated with the collaboration application based at least in part on the first and second vehicle data. Other embodiments are described and claimed.

14 Claims, 8 Drawing Sheets

(58) Field of Classification Search
CPC .. G05D 1/0022; G05D 1/0274; G05D 1/0295; G05D 1/0011; G05D 1/0225; G05D 1/027; G05D 1/661; G05D 1/021; G05D 1/0223; G05D 1/0282; G05D 1/223; G05D 1/225; G05D 1/229; G05D 1/246; H04L 67/12; H04L 61/3025; H04L 67/10; H04L 9/3239; H04L 9/50; H04L 2012/40215; H04L 2012/40273; H04L 41/0893; H04L 12/66; H04L 2209/56; H04L 41/082; H04L 41/0843; H04L 41/0894; H04L 41/28; H04L 43/0876; H04L 47/20; H04L 61/4511; H04L 63/0236; H04L 67/104; H04W 4/40; H04W 4/46; H04W 84/20; H04W 52/322; H04W 4/44; H04W 4/70; H04W 4/08; H04W 84/18; H04W 12/67; H04W 12/106; H04W 4/38; H04W 12/086; H04W 12/088; H04W 12/37; H04W 84/22; H04W 12/69; H04W 12/76; H04W 4/023; H04W 4/80; H04W 4/02
See application file for complete search history.

SYSTEMS AND METHODS FOR IMPLEMENTING AUTONOMOUS VEHICLE COLLABORATION VIA A HYBRID DISTRIBUTED CONNECTED NETWORK

INTRODUCTION

The technical field generally relates to autonomous vehicles, and more particularly relates to systems and methods for implementing autonomous vehicle collaboration via a hybrid distributed connected network.

Autonomous vehicles often collaborate on the performance of different collaboration applications. Collaboration typically involves the exchange of vehicle data associated with each of the autonomous vehicles involved in the performance of the collaboration application. Examples of collaboration applications include, but are not limited to, platooning applications and lane changing applications.

The exchange of vehicle data using an Open Systems Interconnection (OSI) seven layer scheme may introduces inefficiencies in the use of data payload resources and latencies associated with the communication of the vehicle data between the autonomous vehicles.

SUMMARY

In an embodiment, a vehicle collaboration system of a first autonomous vehicle includes a transceiver and a collaboration controller. The transceiver is configured to broadcast a first collaboration message including first vehicle data associated with the first autonomous vehicle in connection with a collaboration application to a collaboration domain group via a hybrid distributed-connected network (HYDIN), the collaboration domain group including at least the first autonomous vehicle and a second autonomous vehicle, and receive a second collaboration message including second vehicle data associated with the second autonomous vehicle in connection with the collaboration application via the HYDIN, the second collaboration message being broadcast from the second autonomous vehicle to the collaboration domain group via the HYDIN. The collaboration controller is configured to implement a collaboration action associated with the collaboration application based at least in part on the first and second vehicle data.

In an embodiment, the first and second collaboration messages consist of a data link layer and a physical layer.

In an embodiment, each of the first and second collaboration messages further include a collaboration application identifier associated with the collaboration application and a domain group identifier associated with the collaboration domain group.

In an embodiment, the collaboration application comprises one of a platooning application and a lane changing application.

In an embodiment, the first vehicle data comprises real time vehicle data.

In an embodiment, the system further includes a local data buffer at the first autonomous vehicle and a resource allocation module at the first autonomous vehicle. The resource allocation module is configured to determine whether buffer space is available at the local data buffer and allocate a first application buffer space in the local data buffer for the collaboration domain group in connection with the collaboration application based on the determination.

In an embodiment, upon a determination that buffer space is available at the local data buffer, the collaboration controller is configured to receive the first vehicle data from a vehicle electronic control unit (ECU) via an in-vehicle bus at a first time and store the first vehicle data at the first application buffer space; broadcast the first collaboration message including the first vehicle data to the HYDIN as real time vehicle data; receive a third vehicle data in connection with the collaboration application from the vehicle ECU via the in-vehicle bus at a second time and store the third vehicle data at the first application buffer space; broadcast a third collaboration message comprising the third vehicle data to the collaboration domain group via the HYDIN as real time vehicle data; retrieve the first and third vehicle data from the first application buffer space; and broadcast a fourth collaboration message comprising the first vehicle data and the third vehicle data at a third time as historical vehicle data.

In an embodiment, upon a determination that buffer space is unavailable at the local data buffer the collaboration controller is configured to receive the first vehicle data from a vehicle ECU via an in-vehicle bus at a first time; broadcast the first collaboration message including the first vehicle data to the collaboration domain group via the HYDIN as real time vehicle data, the second autonomous vehicle being configured to store the first vehicle data at a second application buffer space at the second autonomous vehicle; receive a third vehicle data in connection with the collaboration application from the vehicle ECU via the in-vehicle bus at a second time; broadcast a third collaboration message including the third vehicle data to the collaboration domain group via the HYDIN as real time vehicle data, the second autonomous vehicle being configured to store the third vehicle data at the second application buffer space at the second autonomous vehicle; and receive a fourth collaboration message comprising the first and third vehicle data at a third time, the fourth collaboration message being broadcast by the second autonomous vehicle to the collaboration domain group via the HYDIN at a third time as historical vehicle data associated with the first autonomous vehicle.

In an embodiment, the system further includes a resource identification module at the first autonomous vehicle. The resource identification module is configured to determine whether at least one collaboration message has been received from each of the autonomous vehicles in the collaboration domain group via the HYDIN during a predefined period of time; generate a collaboration domain group list associated with the collaboration domain group based at least in part on the determination; and broadcast a fifth collaboration message comprising the collaboration domain group list to the collaboration domain group via the HYDIN.

In an embodiment, a computer readable medium includes instructions stored thereon for implementing autonomous vehicle collaboration that upon execution by a processor, cause the processor to broadcast a first collaboration message comprising first vehicle data associated with a first autonomous vehicle in connection with a collaboration application from the first autonomous vehicle to a collaboration domain group via a hybrid distributed-connected network (HYDIN), the collaboration domain group including at least the first autonomous vehicle and a second autonomous vehicle; receive a second collaboration message comprising second vehicle data associated with the second autonomous vehicle in connection with the collaboration application via the HYDIN at the first autonomous vehicle, the second collaboration message being broadcast from the second autonomous vehicle to the collaboration domain group via the HYDIN; and implement a collaboration action associated with the collaboration application at the first autonomous vehicle based at least in part on the first and second vehicle data.

In an embodiment, the computer readable medium further includes instructions that upon execution by the processor cause the processor to broadcast the first collaboration message from the first autonomous vehicle to the collaboration domain group via the HYDIN, the first collaboration message comprising, the first vehicle data, a collaboration application identifier associated with the collaboration application, and a domain group identifier associated with the collaboration domain group.

In an embodiment, the computer readable medium further includes instructions that upon execution by the processor cause the processor to determine whether buffer space is available at a local data buffer of the first autonomous vehicle; and allocate a first application buffer space in the local data buffer for the collaboration domain group in connection with the collaboration application based on the determination.

In an embodiment, the computer readable medium further includes instructions that upon a determination that buffer space is available at the local data buffer and upon execution by the processor cause the processor to: receive the first vehicle data from a vehicle electronic control unit (ECU) via an in-vehicle bus at a first time and store the first vehicle data at the first application buffer space; broadcast the first collaboration message including the first vehicle data to the HYDIN as real time vehicle data; receive a third vehicle data in connection with the collaboration application from the vehicle ECU via the in-vehicle bus at a second time and store the third vehicle data at the first application buffer space; broadcast a third collaboration message comprising the third vehicle data to the collaboration domain group via the HYDIN as real time vehicle data; retrieve the first and third vehicle data from the first application buffer space; and broadcast a fourth collaboration message comprising the first vehicle data and the third vehicle data at a third time as historical vehicle data.

In an embodiment, the computer readable medium further includes instructions that upon a determination that buffer space is unavailable at the local data buffer and upon execution by the processor cause the processor to receive the first vehicle data from a vehicle ECU via an in-vehicle bus at a first time; broadcast the first collaboration message including the first vehicle data to the collaboration domain group via the HYDIN as real time vehicle data, the second autonomous vehicle being configured to store the first vehicle data at a second application buffer space at the second autonomous vehicle; receive a third vehicle data in connection with from the vehicle ECU via the in-vehicle bus at a second time; broadcast a third collaboration message including the third vehicle data to the collaboration domain group via the HYDIN as real time vehicle data, the second autonomous vehicle being configured to store the third vehicle data at the second application buffer space at the second autonomous vehicle; and receive a fourth collaboration message comprising the first and third vehicle data at a third time, the fourth collaboration message being broadcast by the second autonomous vehicle to the collaboration domain group via the HYDIN at a third time as historical vehicle data associated with the first autonomous vehicle.

In an embodiment, the computer readable medium further includes instructions that upon execution by the processor cause the processor to: determine whether at least one collaboration message has been received from each of the autonomous vehicles in the collaboration domain group at the first autonomous vehicle via the HYDIN during a pre-defined period of time; generate a collaboration domain group list associated with the collaboration domain group based at least in part on the determination; and broadcast a fifth collaboration message comprising the collaboration domain group list to the collaboration domain group via the HYDIN.

In an embodiment, a method of implementing autonomous vehicle collaboration includes broadcasting a first collaboration message comprising first vehicle data associated with a first autonomous vehicle in connection with a collaboration application from the first autonomous vehicle to a collaboration domain group via a hybrid distributed-connected network (HYDIN), the collaboration domain group including at least the first autonomous vehicle and a second autonomous vehicle; receiving a second collaboration message comprising second vehicle data associated with the second autonomous vehicle in connection with the collaboration application via the HYDIN at the first autonomous vehicle, the second collaboration message being broadcast from the second autonomous vehicle to the collaboration domain group via the HYDIN; and implementing a collaboration action associated with the collaboration application at the first autonomous vehicle based at least in part on the first and second vehicle data.

In an embodiment, broadcasting the first collaboration message comprising the first vehicle data, comprises broadcasting the first collaboration message comprising the first vehicle data, a collaboration application identifier associated with the collaboration application, and a domain group identifier associated with the collaboration domain group.

In an embodiment, the method further includes determining whether buffer space is available at a local data buffer of the first autonomous vehicle; and allocating a first application buffer space in the local data buffer for the collaboration domain group in connection with the collaboration application based on the determination.

In an embodiment, upon a determination that buffer space is available at the local data buffer the method further includes receiving the first vehicle data from a vehicle electronic control unit (ECU) via an in-vehicle bus at a first time and storing the first vehicle data at the first application buffer space; broadcasting the first collaboration message including the first vehicle data to the HYDIN as real time vehicle data; receiving a third vehicle data in connection with the collaboration application from the vehicle ECU via the in-vehicle bus at a second time and storing the third vehicle data at the first application buffer space; broadcasting a third collaboration message comprising the third vehicle data to the collaboration domain group via the HYDIN as real time vehicle data; retrieving the first and third vehicle data from the first application buffer space; and broadcasting a fourth collaboration message comprising the first vehicle data and the third vehicle data at a third time as historical vehicle data.

In an embodiment, upon a determination that buffer space is unavailable at the local data buffer the method further includes receiving the first vehicle data from a vehicle ECU via an in-vehicle bus at a first time; broadcasting the first collaboration message including the first vehicle data to the collaboration domain group via the HYDIN as real time vehicle data, the second autonomous vehicle being configured to store the first vehicle data at a second application buffer space at the second autonomous vehicle; receiving a third vehicle data in connection with the collaboration application from the vehicle ECU via the in-vehicle bus at a second time; broadcasting a third collaboration message including the third vehicle data to the collaboration domain group via the HYDIN as real time vehicle data, the second autonomous vehicle being configured to store the third vehicle data at the second application buffer space at the second autonomous vehicle; and receiving a fourth collaboration message comprising the first and third vehicle data at a third time, the fourth collaboration message being broadcast by the second autonomous vehicle to the collaboration domain group via the HYDIN at the third time as historical vehicle data associated with the first autonomous vehicle.

BRIEF DESCRIPTION OF THE DRAWINGS

Exemplary embodiments will hereinafter be described in conjunction with the following drawing figures, wherein like numerals denote like elements.

DETAILED DESCRIPTION

The following detailed description is merely exemplary in nature and is not intended to limit the application and uses. Furthermore, there is no intention to be bound by any expressed or implied theory presented in the preceding introduction, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It may be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It may be noted that many alternative or additional functional relationships or physical connections may be present in an embodiment of the present disclosure.

Figure 1:
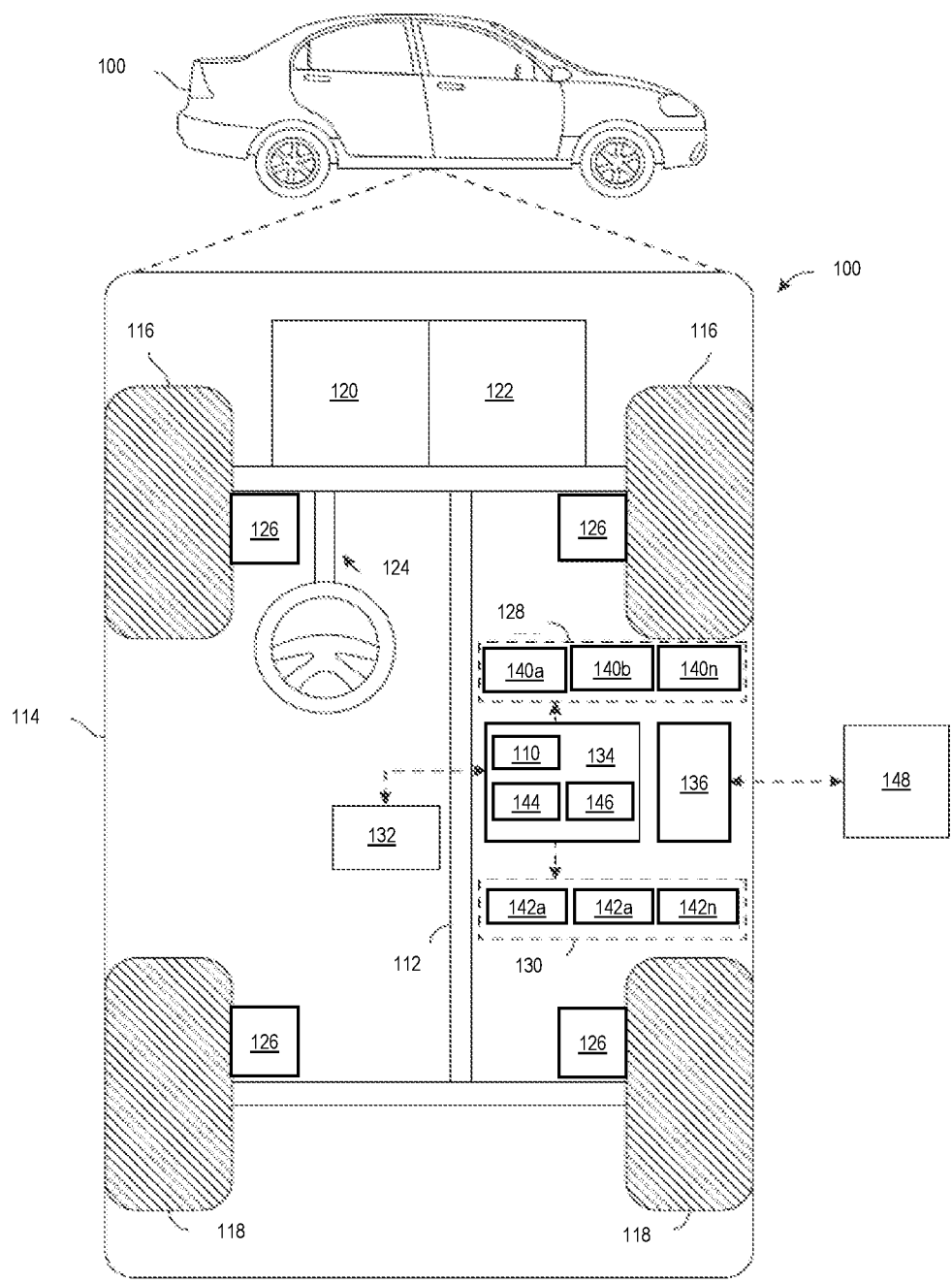
FIG. 1 is a functional block diagram representation of an autonomous vehicle including an embodiment of a vehicle collaboration system.

Referring to FIG. 1 a functional block diagram representation of an autonomous vehicle 100 including an embodiment of a vehicle collaboration system 110 is shown. The autonomous vehicle 100 generally includes a chassis 112, a body 114, front wheels 116, and rear wheels 118. The body 114 is arranged on the chassis 112 and substantially encloses components of the autonomous vehicle 100. The body 114 and the chassis 112 may jointly form a frame. The front wheels 116 and the rear wheels 118 are each rotationally coupled to the chassis 112 near a respective corner of the body 114.

The autonomous vehicle 100 is, for example, a vehicle that is automatically controlled to carry passengers from one location to another. While the autonomous vehicle 100 is depicted in the illustrated embodiment as a passenger car, other examples of autonomous vehicles include, but are not limited to, motorcycles, trucks, sport utility vehicles (SUVs), recreational vehicles (RVs), marine vessels, and aircraft. In an embodiment, the autonomous vehicle 100 is a so-called Level Four or Level Five automation system. A Level Four system indicates "high automation", referring to the driving mode-specific performance by an automated driving system (ADS) of all aspects of the dynamic driving task, even if a human driver does not respond appropriately to a request to intervene. A Level Five system indicates "full automation", referring to the full-time performance by an ADS of all aspects of the dynamic driving task under all roadway and environmental conditions that can be managed by a human driver.

As shown, the autonomous vehicle 100 generally includes a propulsion system 120, a transmission system 122, a steering system 124, a brake system 126, a vehicle sensor system 128, an actuator system 130, at least one data storage device 132, at least one controller 134, and a vehicle communication system 136. The propulsion system 120 may, in various embodiments, include an internal combustion engine, an electric machine such as a traction motor, and/or a fuel cell propulsion system. The transmission system 122 is configured to transmit power from the propulsion system 120 to the front wheels 116 and the rear wheels 118 according to selectable speed ratios. According to various embodiments, the transmission system 122 may include a step-ratio automatic transmission, a continuously-variable transmission, or other appropriate transmission. The brake system 126 is configured to provide braking torque to the front wheels 116 and the rear wheels 118. The brake system 126 may, in various embodiments, include friction brakes, brake by wire, a regenerative braking system such as an electric machine, and/or other appropriate braking systems. The steering system 124 influences a position of the front wheels 116 and the rear wheels 118. While depicted as including a steering wheel for illustrative purposes, in some embodiments contemplated within the scope of the present disclosure, the steering system 124 may not include a steering wheel.

The vehicle sensor system 128 includes one or more vehicle sensing devices 140a-140n that sense observable conditions of the exterior environment and/or the interior environment of the autonomous vehicle 100. Examples of vehicle sensing devices 140a-140n include, but are not limited to, radars, lidars, global positioning systems, optical cameras, thermal cameras, ultrasonic sensors, and/or other sensors. The actuator system 130 includes one or more actuator devices 142a-142n that control one or more vehicle features such as for example, but not limited to, the propulsion system 120, the transmission system 122, the steering system 124, and the brake system 126. In various embodiments, the vehicle features can further include interior and/or exterior vehicle features such as for example, but are not limited to, doors, a trunk, and cabin features such as for example air, music, and lighting.

The vehicle communication system 136 is configured to wirelessly communicate information to and from other entities (vehicle-to-everything (V2X) communication). For example, the vehicle communication system 136 is configured to wireless communicate information to and from other vehicles 148 ("V2V" communication), to and from driving system infrastructure ("vehicle to everything (V2I)" communication), remote systems, and/or personal devices. Examples of driving system infrastructure include, but are not limited, a mobile edge computing (MEC) system 150 including a roadside unit (RSU) 152. In an embodiment, the vehicle communication system 136 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels designed for automotive use and a corresponding set of protocols and standards.

The data storage device 132 stores data for use in automatically controlling the autonomous vehicle 100. The data storage device 132 may be part of the controller 134, separate from the controller 134, or part of the controller 134 and part of a separate system.

The controller 134 includes at least one processor 144 and a computer readable storage device 146. The computer readable storage device 146 may also be referred to a computer readable media 146 and a computer readable medium 146. In an embodiment, the computer readable storage device 146 includes an embodiment of the vehicle collaboration system 110. The processor 144 can be any custom made or commercially available processor, a central processing unit (CPU), a graphics processing unit (GPU), an auxiliary processor among several processors associated with the controller 134, a semiconductor-based microprocessor (in the form of a microchip or chip set), a macroprocessor, any combination thereof, or generally any device for executing instructions. The computer readable storage device 146 may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The computer-readable storage device 146 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 134 in controlling the autonomous vehicle 100.

The instructions may include one or more separate programs, each of which comprises an ordered listing of executable instructions for implementing logical functions. The instructions, when executed by the processor 144, receive and process signals from the vehicle sensor system 128, perform logic, calculations, methods and/or algorithms for automatically controlling the components of the autonomous vehicle 100, and generate control signals to the actuator system 130 to automatically control one or more components of the autonomous vehicle 100 based on the logic, calculations, methods, and/or algorithms. Although only one controller 134 is shown in FIG. 1, alternative embodiments of the autonomous vehicle 100 can include any number of controllers 134 that communicate over any suitable communication medium or a combination of communication mediums and that cooperate to process the sensor signals, perform logic, calculations, methods, and/or algorithms, and generate control signals to automatically control features of the autonomous vehicle 100.

In various embodiments, one or more instructions of the controller 134 are embodied to provide ADS functions as described with reference to one or more of the embodiments herein. The controller 134 or one of its functional modules is configured to implement the functions described with reference to one or a combination of embodiments of the vehicle collaboration system 110.

Figure 2:
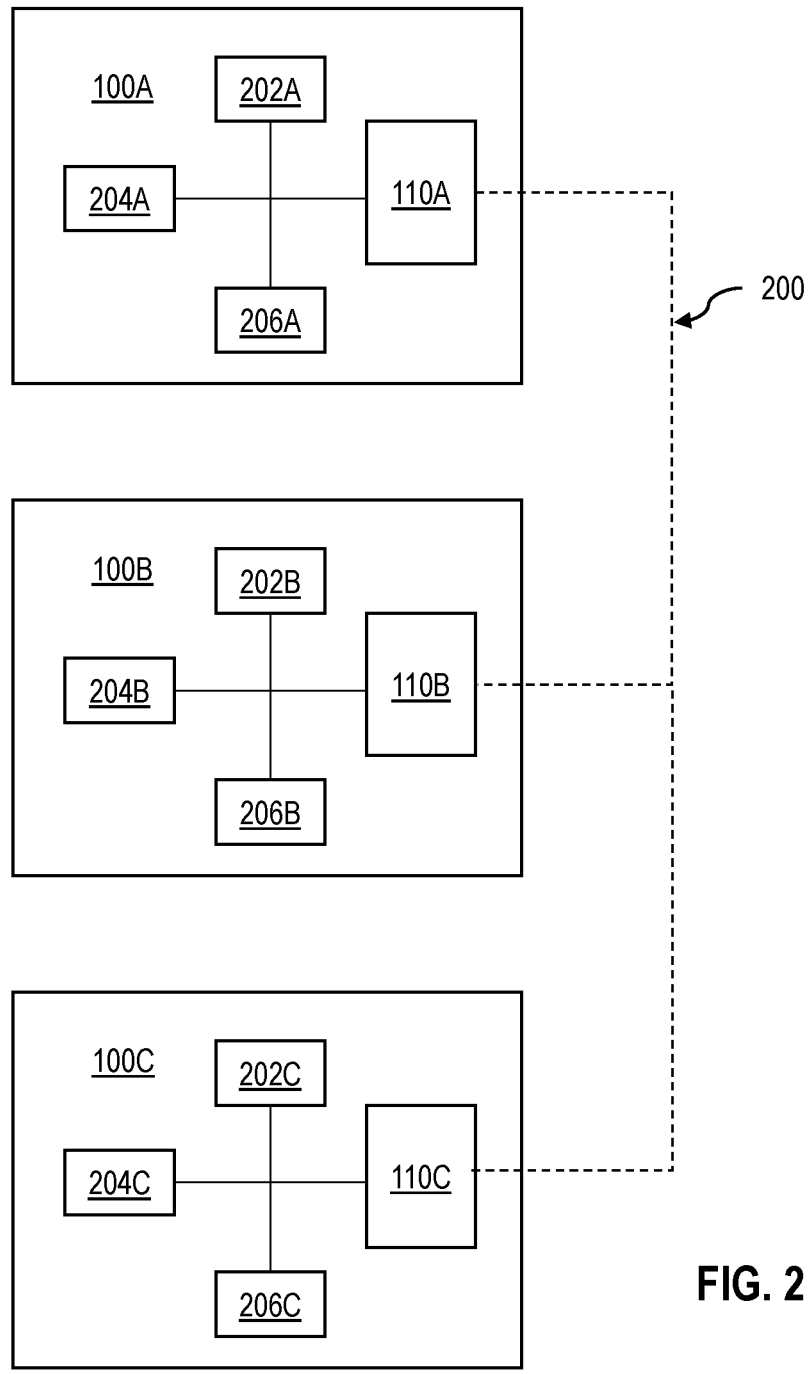
FIG. 2 is a functional block diagram representation of a plurality of autonomous vehicles communicatively coupled via an embodiment of a hybrid distributed connected network (HYDIN)

Referring to FIG. 2, a functional block diagram representation of an example of a plurality of autonomous vehicles 100A, 100B, 100C communicatively coupled via an embodiment of a hybrid distributed connected network (HYDIN) 200 is shown. Each of the autonomous vehicles 100A, 100B, 100C have a configuration that is similar to the autonomous vehicle 100 in FIG. 1. Autonomous vehicle 100A includes a plurality of vehicle electronic control units (ECU) 202A, 204A, 206A and an embodiment of a vehicle collaboration system 110A. The vehicle ECUs 202A, 204A, 206A and the vehicle collaboration system 110A are communicatively coupled via an in-vehicle bus. In an embodiment, the in-vehicle bus is a controller area network bus (CANBUS). While the autonomous vehicle 100A is described as including three vehicle ECUs, alternative embodiments may include a fewer or greater number of vehicle ECUs.

The vehicle collaboration system 110A is configured to received vehicle data from one or more of the vehicle ECUs 202A, 204A, 206A. The vehicle collaboration system 110A is configured form a collaboration domain group with one or more of the autonomous vehicles 100B, 100C to collaborate on a collaboration application. Each collaboration domain group is associated with a domain group identifier. Examples of collaboration applications include, but are not limited, to a platooning application and a lane change application. Each collaboration application is associated with a collaboration application identifier.

The vehicle collaboration system 110A is configured to transmit collaboration messages to and receive collaboration messages from one or more of the autonomous vehicles 100B, 100C in the collaboration domain group via the HYDIN 200 in connection with the collaboration application. The collaboration messages include vehicle data. In an embodiment, the vehicle collaboration system 110A is configured to transmit collaboration messages to and receive collaboration messages from one or more of the autonomous vehicles 100B, 100C in the collaboration domain group via the HYDIN 200 using a distributed network model. In an embodiment, the distributed network model consists of a data link layer and a physical layer. An ADS at autonomous vehicle 100A is configured to implement one or more collaboration actions associated with the collaboration application based at least in part on the vehicle data in the collaboration messages.

Autonomous vehicle 100B includes a plurality of vehicle ECUs 202B, 204B, 206B and an embodiment of a vehicle collaboration system 110B. The vehicle ECUs 202B, 204B, 206B and the vehicle collaboration system 110B are communicatively coupled via an in-vehicle bus. In an embodiment, the in-vehicle bus is a CANBUS. While the autonomous vehicle 100B is described as including three vehicle ECUs, alternative embodiments may include a fewer or greater number of vehicle ECUs.

The vehicle collaboration system 110B is configured to received vehicle data from one or more of the vehicle ECUs 202B, 204B, 206B. The vehicle collaboration system 110B is configured form a collaboration domain group with one or more of the autonomous vehicles 100A, 100C to collaborate on a collaboration application. Each collaboration domain group is associated with a domain group identifier. Each collaboration application is associated with a collaboration application identifier.

The vehicle collaboration system 110B is configured to transmit collaboration messages to and receive collaboration messages from one or more of the autonomous vehicles 100A, 100C in the collaboration domain group via the HYDIN 200 in connection with the collaboration application. The collaboration messages include vehicle data. In an embodiment, the vehicle collaboration system 110B is configured to transmit collaboration messages to and receive collaboration messages from one or more of the autonomous vehicles 100A, 100C in the collaboration domain group via the HYDIN 200 using a distributed network model. In an embodiment, the distributed network model consists of a data link layer and a physical layer. An ADS at autonomous vehicle 100B is configured to implement one or more collaboration actions associated with the collaboration application based at least in part on the vehicle data in the collaboration messages.

Autonomous vehicle 100C includes a plurality of vehicle ECUs 202C, 204C, 206C and an embodiment of a vehicle collaboration system 110C. The vehicle ECUs 202C, 204C, 206C and the vehicle collaboration system 110C are communicatively coupled via an in-vehicle bus. In an embodiment, the in-vehicle bus is a CANBUS. While the autonomous vehicle 100B is described as including three vehicle ECUs, alternative embodiments may include a fewer or greater number of vehicle ECUs.

The vehicle collaboration system 110C is configured to received vehicle data from one or more of the vehicle ECUs 202C, 204C, 206C. The vehicle collaboration system 110C is configured form a collaboration domain group with one or more of the autonomous vehicles 100A, 100B to collaborate on a collaboration application. Each collaboration domain group is associated with a domain group identifier. Examples of collaboration applications include, but are not limited, to a vehicle platooning application and a vehicle lane change application. Each collaboration application is associated with a collaboration application identifier.

The vehicle collaboration system 110C is configured to transmit collaboration messages to and receive collaboration messages from one or more of the autonomous vehicles 100A, 100C in the collaboration domain group via the HYDIN 200 in connection with the collaboration application. The collaboration messages include vehicle data. In an embodiment, the vehicle collaboration system 110C is configured to transmit collaboration messages to and receive collaboration messages from one or more of the autonomous vehicles 100A, 100B in the collaboration domain group via the HYDIN 200 using a distributed network model. In an embodiment, the distributed network model consists of a data link layer and a physical layer. An ADS at autonomous vehicle 100C is configured to implement one or more collaboration actions associated with the collaboration application based at least in part on the vehicle data in the collaboration messages.

While FIG. 2 illustrates three autonomous vehicles 100A. 100B, 100C configured to be communicatively coupled via the HYDIN 200, a fewer or greater number of autonomous vehicles 100 may be configured to be communicatively coupled via the HYDIN 200. While the collaboration domain groups described above include two or three autonomous vehicles 100, the collaboration domain groups may include a greater number of autonomous vehicles 100. In an embodiment, autonomous vehicles 100 within a communication range of each other via the HYDIN may form a collaboration domain group.

Figure 3:
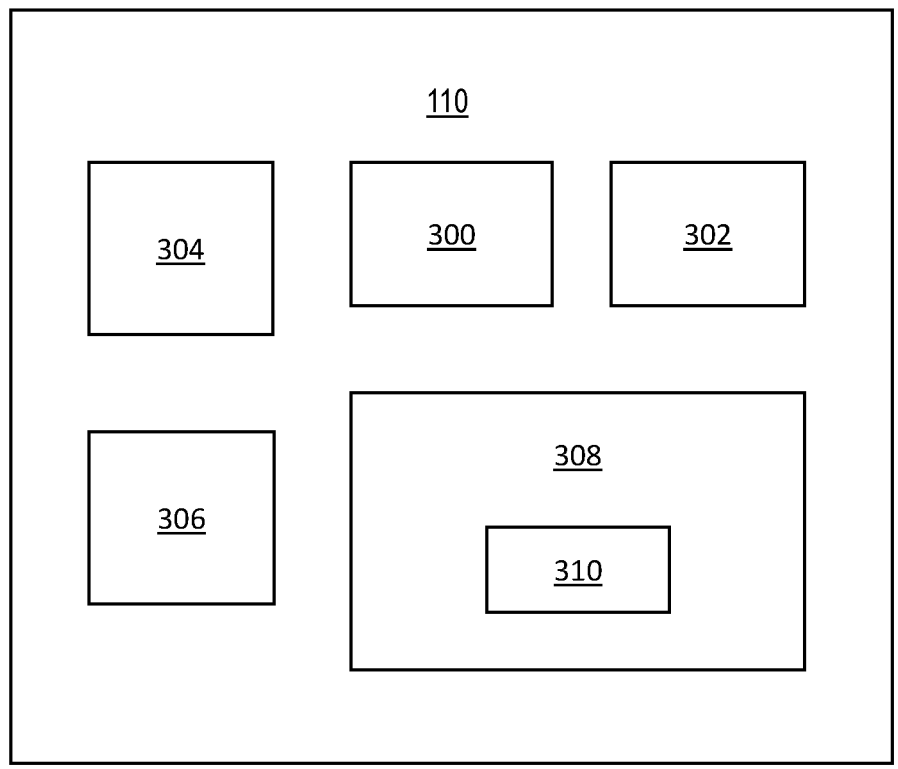
FIG. 3 is a functional block diagram representation of an embodiment of a vehicle collaboration system.

Referring to FIG. 3, a functional block diagram representation of an embodiment of a vehicle collaboration system 110 is shown. The vehicle collaboration system 110 includes a collaboration controller 300, a transceiver 302, a resource allocation module 304, a resource identification module 306, and a local data buffer 308. The collaboration controller 300 is configured to manage operation of the vehicle collaboration system 110 to implement a collaboration application. The transceiver 302 is configured to transmit collaboration messages to other autonomous vehicles 100A, 100B, 100C and receive collaboration messages from other autonomous vehicles 100A, 100B, 100C via the HYDIN 200. In an embodiment, the collaboration messages consist of a data link layer and a physical layer.

A plurality of autonomous vehicles 100A, 100B, 100C may be communicatively coupled to the HYDIN 200. The vehicle collaboration system 110 at each of the plurality of autonomous vehicles 100A, 100B, 100C are configured to broadcast collaboration messages including vehicle data in connection with the collaboration application, a domain group identifier, and a collaboration application identifier to the HYDIN 200. The transceiver 302 at each of the plurality of autonomous vehicles 100A, 100B, 100C are configured to receive the collaboration messages broadcast to the HYDIN 200.

When a transceiver 302 at an autonomous vehicle 100A, 100B, 100C receives the collaborations messages from the HYDIN 200, the collaboration controller 300 at the autonomous vehicle 100A, 100B, 100C identifies the collaboration messages from the received collaboration messages that are relevant to that autonomous vehicle 100A, 100B, 100C. The collaboration controller 300 determines if the autonomous vehicle 100A, 100B, 100C is engaged in a collaboration application with a collaboration domain group. If the collaboration controller 300 determines that the autonomous vehicle 100A, 100B, 100C is engaged in a collaboration application with a collaboration domain group, the collaboration controller 300 identifies the collaboration messages in the received collaboration messages that include the collaboration application identifier associated with the collaboration application and the domain group identifier associated with the collaboration domain group as relevant collaboration messages. The collaboration controller 300 is configured to implement one or more collaboration actions associated with the collaboration application based at least in part on the vehicle data in the relevant collaboration messages, In an embodiment, when an autonomous vehicle 100A, 100B, 100C joins a collaboration domain group to cooperate in a collaboration application, the resource allocation module 304 of that autonomous vehicle 100A, 100B, 100C is configured to allocate application buffer space 310 for that collaboration domain group in connection with the collaboration application in the local data buffer 308. In an embodiment, when an autonomous vehicle 100A, 100B, 100C joins a collaboration domain group, the resource allocation module 304 of that autonomous vehicle 100A, 100B, 100C is configured to determine whether buffer space is available for allocation of application buffer space 310 for that collaboration domain group in connection with the collaboration application in the local data buffer 308.

If the resource allocation module 304 of the autonomous vehicle 100A, 100B, 100C determines that buffer space is available for allocation of application buffer space 310 for that collaboration domain group in connection with the collaboration application in the local data buffer 308, the resource allocation module 304 of that autonomous vehicle 100A, 100B, 100 is configured to allocate application buffer space 310 for that collaboration domain group in connection with the collaboration application in the local data buffer 308. The vehicle collaboration system 110 of the autonomous vehicle 100A, 100B, 100C is configured to notify the other autonomous vehicles 100A, 100B, 100C in the collaboration domain group that application buffer space 310 has been allocated for the collaboration application at the local data buffer 308 of the autonomous vehicle 100A, 100B, 100C via a collaboration message broadcast to the HYDIN 200. The collaboration message includes the domain group identifier associated with the collaboration domain group, the collaboration application identifier associated with the collaboration application, the resource location of the application buffer space 310 in the local data buffer 308, and a size of the allocated application buffer space 310.

If the resource allocation module 304 of the autonomous vehicle 100A, 100B, 100C determines that buffer space is not available for allocation of application buffer space 310 for that collaboration domain group in connection with the collaboration application in the local data buffer 308, the collaboration controller 302 is configured to notify the other autonomous vehicles 100A, 100B, 100C in the collaboration domain group that buffer space is not available for allocation of application buffer space 310 for that collaboration domain group in connection with the collaboration application in the local data buffer 308 of that autonomous vehicle 100A, 100B, 100C via a collaboration message broadcast to the HYDIN 200. The collaboration vehicle system 110 at the other autonomous vehicles 100A, 100B, 100C in the collaboration domain group are configured to act in response to receipt of a collaboration message indicating that an autonomous vehicle 100A, 100B, 100C in the collaboration domain group does not have available buffer space at its local data buffer 308. The actions taken by the collaboration vehicles systems 110 at the other autonomous vehicles 100A, 100B, 100C will be described in greater detail below.

The resource identification module 306 is configured to add autonomous vehicles 100A, 100B, 100C that join a collaboration domain group to a collaboration domain group list and removed autonomous vehicles 100 that drop out of a collaboration domain group from the collaboration domain group list. Additional detail regarding the actions implemented by the resource identification module 306 will be described in greater detail below. While a number of different components of the vehicle collaboration system 110 are shown in FIG. 3, the vehicle collaboration system 110 may include additional components that facilitate implementation of a collaboration application at an autonomous vehicle 100A, 100B, 100C.

Figure 4:
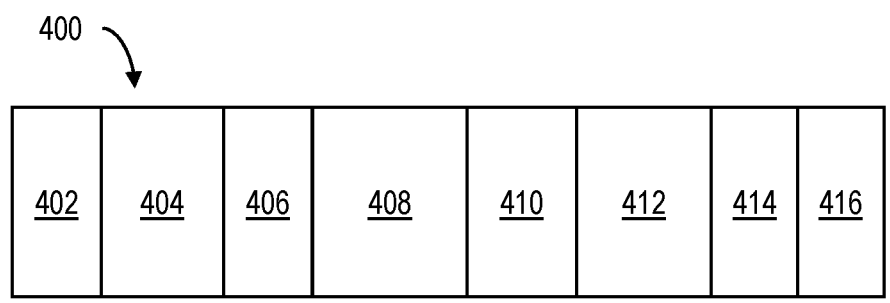
FIG. 4 is a block diagram representation of a collaboration message structure in accordance with an embodiment of a data link layer of a HYDIN protocol.

Referring to FIG. 4, a block diagram representation of an example of collaboration message structure 400 in accordance with an embodiment of a data link layer of a HYDIN protocol is shown. The collaboration message structure 400 includes a start of a frame field 402, a domain group identifier field 404, a collaboration application identifier field 406, a resource location field 408, a data length field 410, a data payload field 412, a cyclic redundancy check (CRC) field 414, and an end of a frame field 416. While one configuration of a collaboration message structure 400 is shown, alternative embodiments of the collaboration message structure 400 may include different fields. While a number of different fields of the collaborative message structure 400 have been described, alternative embodiments of the collaborative message structure may include additional fields.

Figure 5:
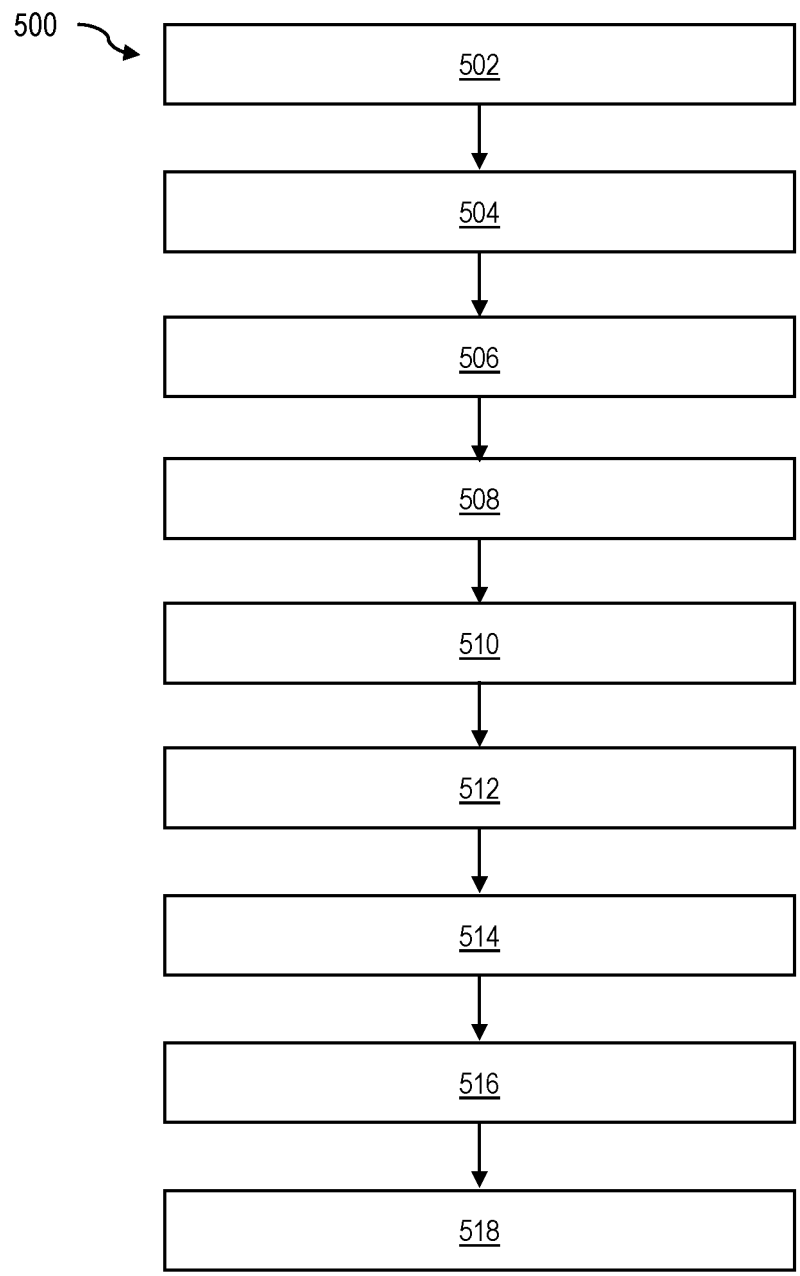
FIG. 5 is a flow chart representation of an example of a method of implementing autonomous vehicle collaboration.

Referring to FIG. 5, a flow chart representation of an example of a method 500 of implementing autonomous vehicle collaboration is shown. The method 500 is performed by embodiments of vehicle collaboration systems 110A, 110B, 110C in autonomous vehicles 100A, 100B, 100C. The method 500 may be performed by the vehicle collaboration system 110A, 110B, 110C in combination with other components of the autonomous vehicle 100A, 100B, 100C. The method 500 may be performed by hardware circuitry, firmware, software, and/or combinations thereof. The method 500 is described with reference to FIG. 2 and FIG. 3.

At 502, the vehicle collaboration systems 110A, 110B, 110C of a two or more autonomous vehicles 100A, 100B, 100C form a collaboration domain group to implement a collaboration application. At 504, the resource allocation module 304 at each of the autonomous vehicles 100A, 100B, 100C in the collaboration domain group that have buffer space is available for allocation to the collaboration domain group in connection with the collaboration application in the local data buffer 308 allocate the application buffer space 310.

At 506 the vehicle collaboration system 110A, 110B, 110C of each the autonomous vehicles 100A, 100B, 100C in the collaboration domain group notifies the vehicle collaboration systems 110A, 110B, 110C of the other autonomous vehicles 100A, 100B, 100C in the collaboration domain group of the allocated application buffer space 310 for the collaboration domain group in connection with the collaboration application. If the resource allocation module 304 at an autonomous vehicle 100A, 100B, 100C determined that buffer space was not available for allocation to the collaboration domain group in the local data buffer 308, vehicle collaboration system 110A, 110B, 110C of that autonomous vehicle 100A, 100B, 100C informs the vehicle collaboration systems 110A, 110B, 110C of the other autonomous vehicles 100A, 100B, 100C in the collaboration domain group.

At 508, the vehicle collaboration system 110A, 110B, 110C of each of the autonomous vehicles 100A, 100B, 100C in the collaboration domain group receives real time vehicle data from one or more of the vehicle ECUs 202, 204, 206 at the autonomous vehicle 100A, 100B, 100C via the in-vehicle bus. At 510, the vehicle collaboration system 110A, 110B, 110C of each of the autonomous vehicles 100A, 100B, 100C with allocated application buffer space 310 stores the real time vehicle data received from the vehicle ECUs 202, 204, 206 at the allocated application buffer space 310.

At 512, the vehicle collaboration system 110A, 110B, 110C of each of the autonomous vehicles 100A, 100B, 100C in the collaboration domain group broadcasts a collaborative message including the real time vehicle data, the collaboration application identifier, and the domain group identifier to the other autonomous vehicles 100A, 100B, 100C in the collaboration domain group via the HYDIN 200. The collaboration controller 302 at each of the autonomous vehicles 100A, 100B, 100C implements one or more collaboration actions associated with the collaboration application based at least in part on the real time vehicle data generated at that autonomous vehicle 100A, 100B, 100C and the real time vehicle data received from the other autonomous vehicle 100A, 100B, 100C in the collaboration domain group. At 514, the vehicle collaboration system 110A, 110B, 110C of each of the autonomous vehicles 100A, 100B, 100C with allocated collaboration application buffer space 310 stores the real time vehicle data received from the vehicle collaboration systems 110A, 110B, 110C of autonomous vehicles 100A, 100B, 100C without allocated application buffer space 310 at their allocated application buffer space 310.

At 516, the vehicle collaboration system 110A, 110B, 110C of each of the autonomous vehicles 100A, 100B, 100C in the collaboration domain group with allocated application buffer space 310 broadcasts a collaboration message including historical vehicle data associated with that autonomous vehicle data and historical vehicle data associated with autonomous vehicles without allocated application buffer space 310 to the other autonomous vehicles 100A, 100B, 100C in the collaboration domain group via the HYDIN 200. The collaboration controller 302 at each of the autonomous vehicles 100A, 100B, 100C implements one or more collaboration actions associated with the collaboration application based at least in part on the historical vehicle data associated with the autonomous vehicle 100A, 100B, 100C in the collaboration domain group.

One of the autonomous vehicles 100A, 100B, 100C in the collaboration domain group operates as a lead autonomous vehicle 100A. 100B. 100C. At 518, the resource identification module 306 at the lead autonomous vehicle 100A, 100B, 100C maintains a collaboration domain group list of the autonomous vehicles 100A, 100B, 100C in the collaboration domain group. The resource identification module 306 drops an autonomous vehicle 100A, 100B, 100C from the collaboration domain group if a collaboration message is not received from that autonomous vehicle 100A, 100B, 100C within a pre-defined period of time. The vehicle collaboration system 110A, 110B, 110C of the lead autonomous vehicle 100A, 100B, 100C broadcasts a collaboration message including the collaboration domain group list, the collaboration application identifier, and the domain group identifier to the other autonomous vehicles 100A, 100B, 100C in the collaboration domain group via the HYDIN 200.

Figure 6:
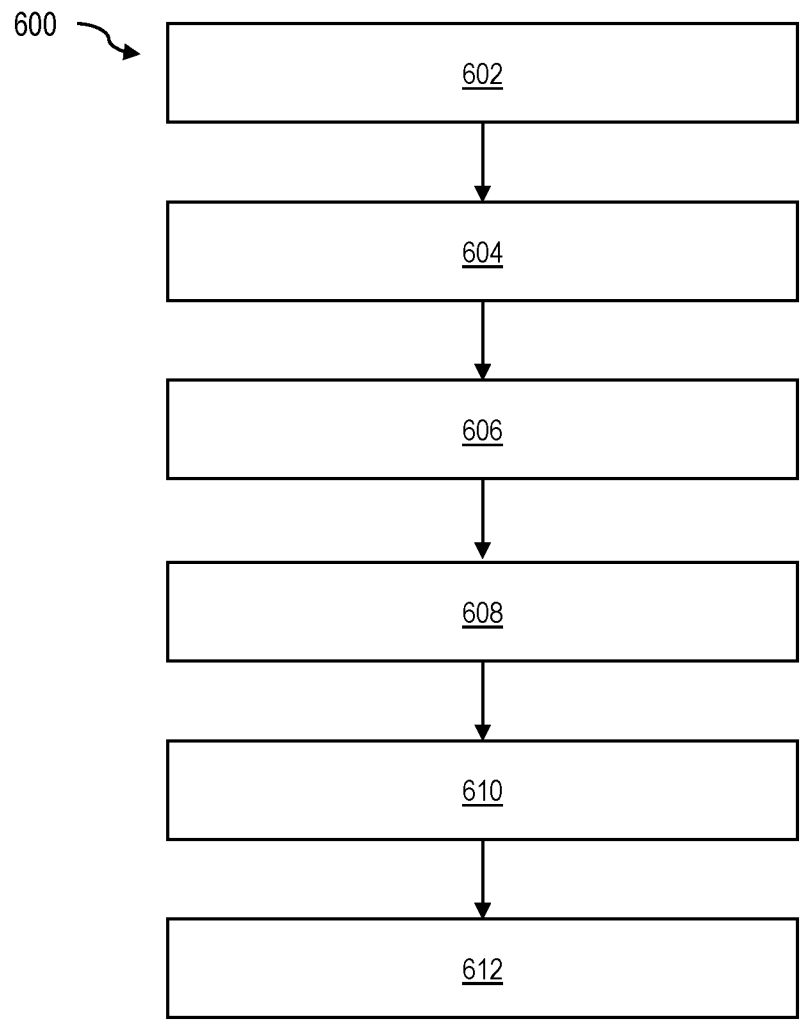
FIG. 6 is a flow chart representation of an example of a method of forming a collaboration domain group.

Referring to FIG. 6, a flow chart representation of an example of a method 600 of forming a collaboration domain group is shown. The method 600 is performed by an embodiment of a vehicle collaboration system 110A, 110B. The method 600 may be performed by the vehicle collaboration system 110A, 110B in combination with other components of the autonomous vehicle 100A, 100B. The method 600 may be performed by hardware circuitry, firmware, software, and/or combinations thereof. The method 600 is described with reference to FIG. 2 and FIG. 3. While the example will be described with reference to a formation of a collaboration domain group including two autonomous vehicles 100A, 100B, a collaboration domain group can be formed using more than two autonomous vehicles.

At 602, a first vehicle collaboration system 110A at a first autonomous vehicle 100A and a second vehicle collaboration system 110B at a second autonomous vehicle 100B each broadcast a collaboration message including a collaboration request associated with a collaboration application to the HYDIN 200. Each collaboration message includes a collaboration application identifier and vehicle data relevant to the collaboration application.

For example, the first vehicle collaboration system 110A at the first autonomous vehicles 100A may broadcast a first collaboration message including a collaboration request associated with a platooning application to the HYDIN 200 and the second vehicle collaboration system 110B at the second autonomous vehicles 100B may broadcast a second collaboration message including a collaboration request associated with the platooning application to the HYDIN 200. The first collaboration request includes vehicle data associated with the first autonomous vehicle 100A relevant to the platooning application and the collaboration application identifier associated with the platooning application. The second collaboration request includes vehicle data associated with the second autonomous vehicle 100B relevant to the platooning application and the collaboration application identifier associated with the platooning application. Examples of the vehicle data include vehicle location, vehicle speed, and vehicle location.

At 604, the autonomous vehicles 100A, 100B, 100C that are communicatively coupled to the HYDIN 200 receive the first and second collaboration messages including the collaboration requests associated with the collaboration application broadcast by the first and second autonomous vehicles 100A, 100B.

At 606, the vehicle collaboration systems 110A, 110B, 110C at the autonomous vehicles 100A, 100B, 100C identify the received collaboration messages that are relevant to that autonomous vehicle 100A, 100B, 100C. For example, since both the first and second collaboration requests include the same collaboration application identifier, the first autonomous vehicle 100A identifies the second collaboration message broadcast by the second autonomous vehicle 100B as relevant to the first autonomous vehicle 100A and the second autonomous vehicle 100B identifies the first collaboration message broadcast by the first autonomous vehicle 100A as relevant to the second autonomous vehicle 100B. The vehicle collaboration system 110C at the third autonomous vehicle 100C determines that the first and second collaboration messages are not relevant to the third autonomous vehicle 100C since the third vehicle collaboration system 110C did not broadcast a collaboration message including the same collaboration identifier.

At 608, the first and second vehicle collaboration systems 110A, 110B at the first and second autonomous vehicles 110A, 110B, respectively, identify a lead autonomous vehicle 100A associated with the implementation of the collaboration application based on the vehicle data received in the first and second collaboration messages. For example, the first vehicle collaboration system 110A at the first autonomous vehicle 100A and the second vehicle collaboration system 110B at the second autonomous vehicle 100A receive the platooning request. The vehicle location of the first autonomous vehicle 110A is included in the first collaboration message and the vehicle location of the second autonomous vehicle 110B is included in the second collaboration message. The vehicle location of the first autonomous vehicle 100A may be in a leading position relative to the vehicle location of the second autonomous vehicle 100B. Accordingly, the first and second vehicle collaboration systems 110A, 110B may identify the first autonomous vehicle 100A as the lead autonomous vehicle 100A.

At 610, the vehicle collaboration system 110A at the lead autonomous vehicle 100A determines a collaboration domain group for the collaboration application including the first and second autonomous vehicles 100A, 100B that broadcast the first and second collaboration messages including the collaboration request associated with the collaboration application and a domain group identifier for the collaboration domain group. For example, the vehicle collaboration system 110A at the lead autonomous vehicle 100A may determine a collaboration domain group including the first and second autonomous vehicles 100A, 100B for the platooning application and generate a domain group identifier for the collaboration domain group associated with the platooning application.

At 612, the vehicle collaboration system 110A at the lead autonomous vehicle 100A broadcasts a collaboration message including the domain group identifier, the collaboration application identifier, and a collaboration domain group list of the autonomous vehicles 100A, 100B in the collaboration domain group to the HYDIN 200. The vehicle collaboration systems 110A, 110B of the autonomous vehicles 100A, 100B in the collaboration domain group receive the collaboration message including the domain group identifier and the collaboration domain list from the HYDIN 200. For example, the vehicle collaboration system 110A at the lead autonomous vehicle 100A may broadcast a collaboration message including the domain group identifier for the platooning collaboration domain group, the collaboration application identifier associated with the platooning application, and the collaboration domain group list including the first and second autonomous vehicles 100A, 100B in the platoon to the HYDIN 200. The vehicle collaboration systems 110A, 110B of the autonomous vehicles 100A, 100B in the platooning collaboration domain group receive the collaboration message from the HYDIN 200.

Figure 7:
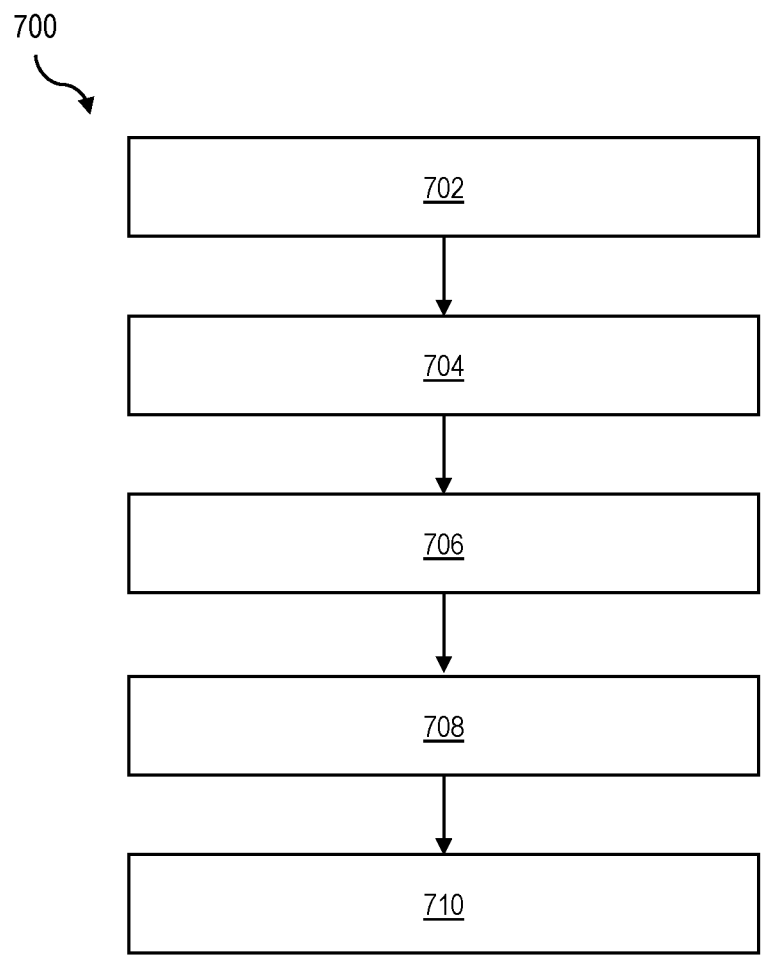
FIG. 7 is a flow chart representation of an example of a method of adding an autonomous vehicle to a collaboration domain group.

Referring to FIG. 7, a flow chart representation of an example of a method 700 of adding an autonomous vehicle 100C to a collaboration domain group of autonomous vehicles 100A, 100B is shown. The method 700 is performed by a vehicle collaboration systems 110A, 110B, 110C. The method 700 may be performed by the vehicle collaboration systems 110A, 110B, 110C in combination with other components of the autonomous vehicles 100A, 100B, 100C. The method 700 may be performed by hardware circuitry, firmware, software, and/or combinations thereof. The method 700 is described with reference to FIG. 2, FIG. 3, and FIG. 6. While the example will be described with reference to an addition of an autonomous vehicle 100C to a collaboration domain group including two autonomous vehicles 100A, 100B, a collaboration domain group may include a greater number of autonomous vehicles. The example will be described with respect to adding a third autonomous vehicle 100C to the collaboration domain group formed in FIG. 6.

At 702, a third vehicle collaboration system 110C at a third autonomous vehicle 100C broadcasts a collaboration message including a collaboration request associated with a collaboration application to the HYDIN 200. The collaboration message includes a collaboration application identifier and vehicle data relevant to the collaboration application. For example, the third vehicle collaboration system 110C at the first autonomous vehicles 100C may broadcast a collaboration message including a collaboration request associated with a platooning application to the HYDIN 200. The collaboration request includes vehicle data associated with the third autonomous vehicle 100C relevant to the platooning application and the collaboration application identifier associated with the platooning application. Examples of the vehicle data include vehicle location, vehicle speed, and vehicle location.

At 704, the first and second autonomous vehicles 100A, 100B receive the collaboration message including the collaboration request associated with the collaboration application broadcast by the third autonomous vehicle 100C via the HYDIN 200. The collaboration domain group includes the first and second autonomous vehicles 100A, 100B. For example, the existing collaboration domain group associated with the platooning application includes the first and second autonomous vehicles 100A, 100B.

At 706, the first vehicle collaboration system 110A of the lead autonomous vehicle 100A in the collaboration domain group broadcasts a collaboration message acknowledging receipt of the collaboration request and the addition of the third autonomous vehicle 100C to the collaboration domain group associated with the collaboration application. For example, the first vehicle collaboration system 110A of the lead autonomous vehicle 100A in the collaboration domain group broadcasts a collaboration message acknowledging receipt of the collaboration request and the addition of the third autonomous vehicle to the collaboration domain group associated with the platooning application to the HYDIN 200.

At 708, the first vehicle collaboration system 110A at the lead autonomous vehicle 100A broadcasts a collaboration message including the domain group identifier, the collaboration application identifier, and an updated collaboration domain group list of the autonomous vehicles 100A, 100B, 100C in the collaboration domain group to the HYDIN 200. For example, the vehicle collaboration system 110A at the lead autonomous vehicle 100A may broadcast a collaboration message including the domain group identifier for the platooning collaboration domain group, the collaboration application identifier associated with the platooning application, and the collaboration domain group list including the first, second and third autonomous vehicles 100A, 100B, 100C in the platoon to the HYDIN 200.

At 710, the vehicle collaboration systems 110B, 110C of the autonomous vehicles 100B, 100C in the collaboration domain group receive the collaboration message including the domain group identifier, the collaboration application identifier, and the updated collaboration domain list from the HYDIN 200. For example, the vehicle collaboration systems 110B, 110C of the autonomous vehicles 100B, 100C in the platooning collaboration domain group receive the collaboration message from the HYDIN 200.

Figure 8:
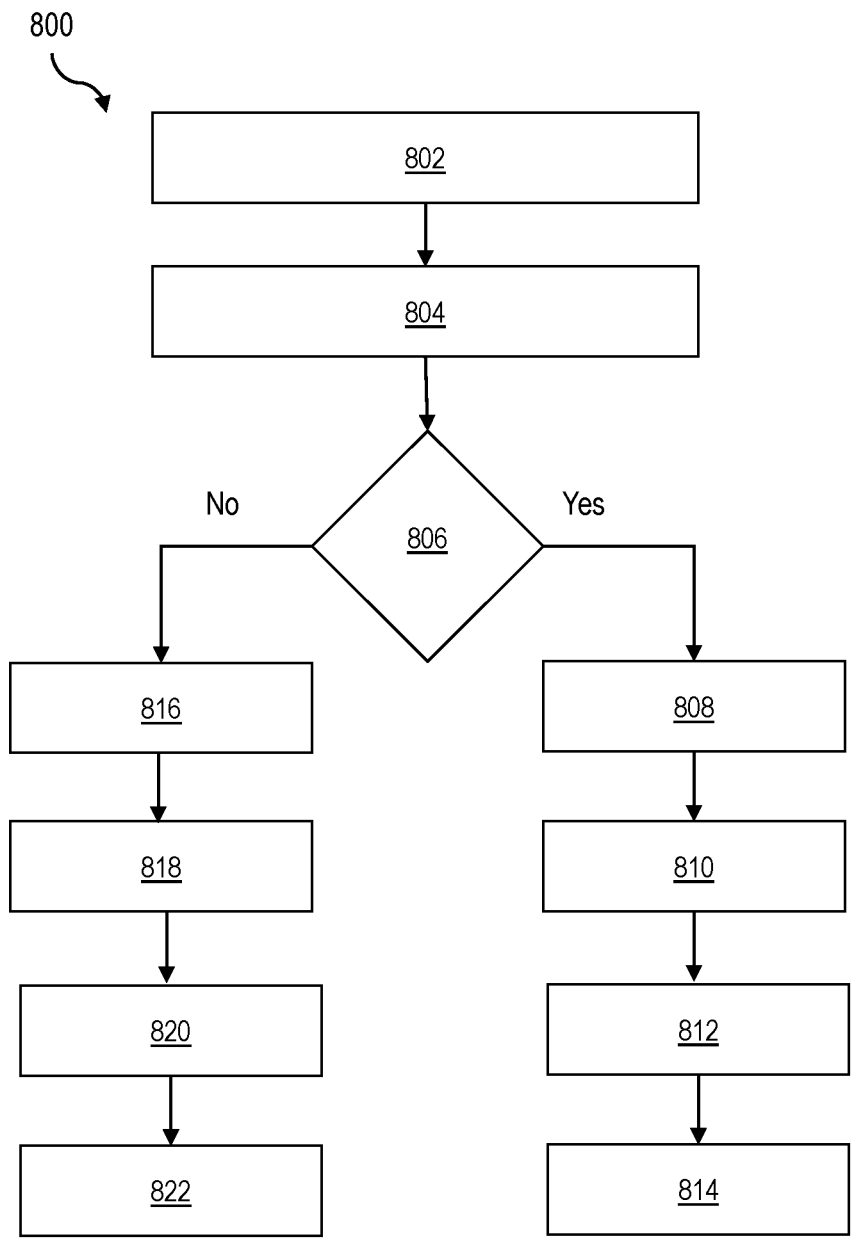
FIG. 8 is a flow chart representation of an example of a method of allocating application buffer space in connection with a collaboration application in a collaboration domain group.

Referring to FIG. 8, a flow chart representation of an example of a method 800 of allocating application buffer space 310 in connection with a collaboration application in a collaboration domain group is shown. The method 800 is performed by embodiments of the vehicle collaboration system 110A, 110B. The method 800 may be performed by the vehicle collaboration systems 110A, 110B in combination with other components of the autonomous vehicles 100A, 100B. The method 800 may be performed by hardware circuitry, firmware, software, and/or combinations thereof. The method 800 is described with reference to FIG. 2, FIG. 3, and FIG. 6. While the example will be described with reference to a collaboration domain group including two autonomous vehicles 100A, 100B, a collaboration domain group may include a greater number of autonomous vehicles.

At 802, the vehicle collaboration system 110A at the lead autonomous vehicle 100A broadcasts a collaboration message including a resource request to the HYDIN 200. The collaboration message includes the domain group identifier and the collaboration application identifier. At 804, the collaboration message including the resource request is received by the second and third vehicle collaboration systems 110B, 110C of the autonomous vehicles 100B, 100C that are communicatively coupled to the HYDIN 200. The second vehicle collaboration system 110B of the second autonomous vehicle 100B identifies the collaboration message including the resource request as a relevant collaboration message based on the domain group identifier and the collaboration application identifier in the collaboration message.

At 806, the resource allocation module 304 at each of the first and second vehicle collaboration systems 110A, 110B of the first and second autonomous vehicles 100A, 100B determines whether buffer space is available for allocation of application buffer space 310 for the collaboration domain group in connection with the collaboration application in the local data buffer 308. If the resource allocation module 304 of the first autonomous vehicle 100A in the collaboration domain group determines that buffer space is available for allocation of application buffer space 310 for the collaboration domain group in connection with the collaboration application in its local data buffer 308, at 808, the resource allocation module 304 of the first autonomous vehicle 100A allocates application buffer space 310 at its local data buffer 308.

At 810, the first vehicle collaboration system 110A of the autonomous vehicle 100A that has allocated application buffer space 310 at its local data buffer 308 broadcasts a collaboration message notifying the other autonomous vehicles 100B in the collaboration domain group that application buffer space 310 has been allocated for the collaboration application at the local data buffer 308 of the autonomous vehicle 100A to the HYDIN 200. The collaboration message includes the domain group identifier associated with the collaboration domain group, the collaboration application identifier associated with the collaboration application, the resource location of the application buffer space 310 in the local data buffer 308, and a size of the allocated application buffer space 310.

At 812, when the first vehicle collaboration system 110A of the first autonomous vehicle 100A that has allocated application buffer space 310 in its local data buffer 308 receives vehicle data in connection with the collaboration application from the vehicle ECUs 202A, 204A, 206A via the in-vehicle bus, the first vehicle collaboration system 110A stores the vehicle data in the allocated application buffer space 310 and broadcasts a collaboration message to the other autonomous vehicles 100B in the collaboration group via the HYDIN 200. The collaboration message includes the domain group identifier, the collaboration application identifier, the vehicle data, the resource location of the application buffer space. The vehicle data is real time vehicle data. The collaboration controller 300 at each of the autonomous vehicles 100A, 100B in the collaboration domain group implements one or more collaboration actions associated with the collaboration application based at least in part on the vehicle data.

At 814, the first vehicle collaboration system 110A of the first autonomous vehicle 100A that has allocated application buffer space 310 in its local data buffer 308 retrieves a pre-defined number of vehicle data entries associated with the first autonomous vehicle 100A previously stored in the allocated application buffer space 310 and broadcasts a collaboration message including the retrieved vehicle data to the other autonomous vehicles 100B in the collaboration domain group via the HYDIN 200. The collaboration message includes the domain group identifier, the collaboration application identifier, the retrieved vehicle data associated with the first autonomous vehicle 100A, and the resource location of the application buffer space 310. The vehicle data is historical vehicle data. The collaboration controller 300 at each of the autonomous vehicles 100A, 100B in the collaboration domain group implements one or more collaboration actions associated with the collaboration application based at least in part on the vehicle data.

If at 806, the resource allocation module 304 of the second autonomous vehicle 100B in the collaboration domain group determines that buffer space is not available for allocation of application buffer space 310 for the collaboration domain group in connection with the collaboration application in its local data buffer 308, at 816, the second vehicle collaboration system 110B broadcasts a collaboration message notifying the other autonomous vehicles 100A in the collaboration domain group that buffer space is not available for allocation of application buffer space 310 at its local data buffer 308 via the HYDIN 200. The collaboration message includes the domain group identifier associated with the collaboration domain group, the collaboration application identifier associated with the collaboration application, and a notification regarding the unavailability of buffer space.

At 818, when the second vehicle collaboration system 110B of the second autonomous vehicle 100B that is unable to allocate application buffer space 310 in its local data buffer 308 receives vehicle data in connection with the collaboration application from the vehicle ECUs 202B, 204B, 206B via the in-vehicle bus, the second vehicle collaboration system 110B broadcasts a collaboration message to the other autonomous vehicles 100A in the collaboration group via the HYDIN 200 but does not store the vehicle data at its local data buffer 308. The collaboration message includes the domain group identifier, the collaboration application identifier, and the vehicle data. The vehicle data is real time vehicle data. The collaboration controller 300 at each of the autonomous vehicles 100A, 100B in the collaboration domain group implements one or more collaboration actions associated with the collaboration application based at least in part on the vehicle data.

At 820, when the first vehicle collaboration system 110A of the first autonomous vehicle 100A that has allocated application buffer space 310 in its local data buffer 308 receives the collaboration message including the real time vehicle data associated with the second autonomous vehicle 100B that is unable to allocate application buffer space 310 at its local data buffer 308 via the HYDIN 200, the first vehicle collaboration systems 110A of the first autonomous vehicle 100A with allocated application buffer space 310 stores the real time vehicle data associated with the second autonomous vehicle 100B at the allocated application buffer space 310 in its local data buffer 308.

At 822, the first vehicle collaboration system 110A of the first autonomous vehicle 100A that has allocated application buffer space 310 retrieves a pre-defined number of vehicle data entries associated with the second autonomous vehicle 100B that were previously stored in the allocated application buffer space 310 of the first autonomous vehicle 100A and broadcasts a collaboration message including the retrieved vehicle date to the other autonomous vehicles 110B in the collaboration domain group via the HYDIN 200. The collaboration message includes the domain group identifier, the collaboration application identifier, the retrieved vehicle data associated with the second autonomous vehicle 100B, and the resource location of the application buffer space. The vehicle data is historical vehicle data associated with the second autonomous vehicle 100B. The collaboration controller 300 at each of the autonomous vehicles 100A, 100B in the collaboration domain group implements one or more collaboration actions associated with the collaboration application based at least in part on the vehicle data.

Figure 9:
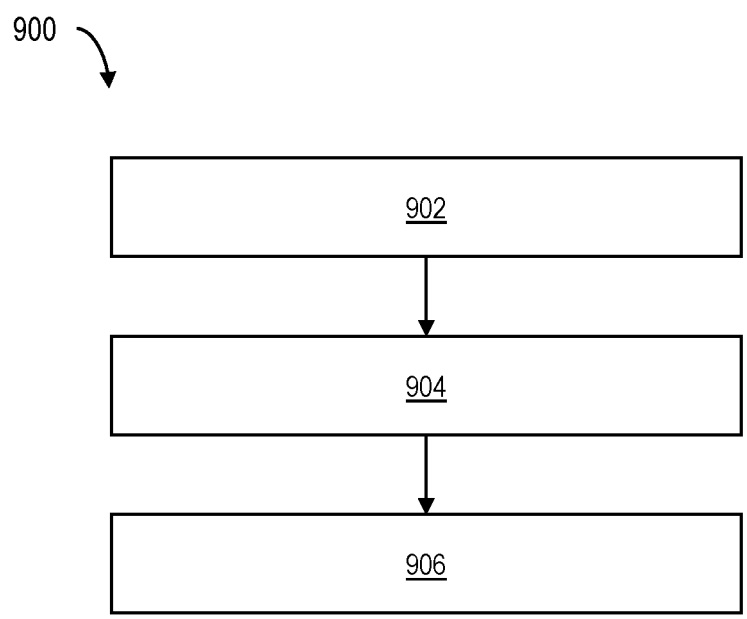
FIG. 9 is a flow chart representation of an example of a method of implementing autonomous vehicle collaboration.

Referring to FIG. 9, a flow chart representation of an example of a method 900 of implementing autonomous vehicle collaboration is shown. The method 900 is performed by a vehicle collaboration system 110A. The method 900 may be performed by the vehicle collaboration system 110A in combination with other components of the autonomous vehicle 100A. The method 900 may be performed by hardware circuitry, firmware, software, and/or combinations thereof.

At 902, a first collaboration message comprising first vehicle data associated with a first autonomous vehicle 100A in connection with a collaboration application is broadcast from the first autonomous vehicle 100A to a collaboration domain group 100A, 100B, 100C via a hybrid distributed-connected network (HYDIN) 200. The collaboration domain group includes at least the first autonomous vehicle 100A and a second autonomous vehicle 100B. At 904, a second collaboration message comprising second vehicle data associated with the second autonomous vehicle 100B in connection with the collaboration application is received via the HYDIN 200 at the first autonomous vehicle 100A, the second collaboration message being broadcast from the second autonomous vehicle 100B to the collaboration domain group 100A, 100B, 100C via the HYDIN 200. At 906, a collaboration action associated with the collaboration application is implemented at the first autonomous vehicle 100A based at least in part on the first and second vehicle data.

The vehicle collaboration system 110 may enable the exchange of vehicle data between autonomous vehicles 100 in a collaboration domain group via in-vehicle bus channel and the HYDIN wireless communication channel. The distribution of the vehicle collaboration systems 110 in autonomous vehicles 100 may enable the achievement of collaborative tasks that are transparent to upper layer applications. The use of vehicle collaboration systems 110 that communicate via a HYDIN 200 may make the implementation of collaboration applications among the autonomous vehicles 100 in a collaboration domain group relatively more efficient. The resource allocation module 302 may enable an efficient use of local data buffer resources within a collaboration domain group. The use of vehicle collaboration systems 110 in conjunction with the use of a two-layer communication model to exchange vehicle data via a HYDIN 200 may reduce the use of data payload resources and reduce latencies associated with the exchange of vehicle data.

When the collaboration application is a platooning application, the vehicle collaboration systems 110 associated with the autonomous vehicles 100 engaged a platooning application may be distributed through the different autonomous vehicles 100 within a platooning fleet. The autonomous vehicles 100 can communicate with each other with and share vehicle data including vehicle wheel speed, vehicle speed, vehicle heading and other information as a star network distribution. The vehicle collaboration system 110 may operate as a central controller that can gather the information directly from HYDIN 200 and optimize the speed and the location of autonomous vehicles 100 in a platooning fleet. The vehicle collaboration systems 110 are in the same domain and may be transparent to the physical location.

When the collaboration applications are V2X applications, the software stack of a V2X lower layer could be integrated into vehicle collaboration systems 110. Basic safety message may be integrated with other vehicle data and distributed to the surrounding autonomous vehicles 100 with V2X capabilities via the HYDIN 200. Risk levels may be calculated and distributed to the autonomous vehicles 100 in a collaboration domain group simultaneously to reduce the overall cost. Warning messages may be illustrated at the same time across the autonomous vehicles 100 in a collaboration domain group.

When the collaboration application involves collaborative autonomous driving, the vehicle perception results are typically distributed to the autonomous vehicles 100 in a collaborative manner. Decision modules may be able to transparently obtain vehicle data from other autonomous vehicles and make generate relatively more accurate decisions.

When the collaboration application is associated with decentralization, distributed vehicle collaboration systems 110 may be able to arbitrarily select the healthy vehicle collaboration systems 110 to continue with decision and collaborative tasks (e.g. if more than half of the vehicle collaboration systems 110 are healthy). Autonomous vehicles 100 with lower resources can handle smaller computing tasks based on the overall optimized algorithm. This may help manage failure and task efficiency.

While at least one exemplary embodiment has been presented in the foregoing detailed description, it may be appreciated that a vast number of variations exist. It may also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It is to be understood that various changes can be made in the function and arrangement of elements without departing from the scope of the disclosure as set forth in the appended claims and the legal equivalents thereof.

What is claimed is:

1. A vehicle collaboration system of an autonomous vehicle, comprising:
a transceiver at a first autonomous vehicle configured to:
broadcast a first collaboration message comprising first vehicle data associated with the first autonomous vehicle in connection with a collaboration application to a collaboration domain group via a hybrid distributed-connected network (HYDIN), the collaboration domain group including at least the first autonomous vehicle and a second autonomous vehicle; and receive a second collaboration message comprising second vehicle data associated with the second autonomous vehicle in connection with the collaboration application via the HYDIN, the second collaboration message being broadcast from the second autonomous vehicle to the collaboration domain group via the HYDIN;

a collaboration controller at the first autonomous vehicle configured to implement a collaboration action associated with the collaboration application based at least in part on the first and second vehicle data;

a local data buffer at the first autonomous vehicle; and a resource allocation module at the first autonomous vehicle, the resource allocation module configured to:
determine whether buffer space is available at the local data buffer; and
allocate a first application buffer space in the local data buffer for the collaboration domain group in connection with the collaboration application based on the determination, wherein upon a determination that buffer space is available at the local data buffer, the collaboration controller is configured to:
receive the first vehicle data from a vehicle electronic control unit (ECU) via an in-vehicle bus at a first time and store the first vehicle data at the first application buffer space;
broadcast the first collaboration message including the first vehicle data to the HYDIN as real time vehicle data;
receive a third vehicle data in connection with the collaboration application from the vehicle ECU via the in-vehicle bus at a second time and store the third vehicle data at the first application buffer space;
broadcast a third collaboration message comprising the third vehicle data to the collaboration domain group via the HYDIN as real time vehicle data;
retrieve the first and third vehicle data from the first application buffer space; and
broadcast a fourth collaboration message comprising the first vehicle data and the third vehicle data at a third time as historical vehicle data.

2. The system of claim 1, wherein the first and second collaboration messages consist of a data link layer and a physical layer.

3. The system of claim 1, wherein each of the first and second collaboration messages further comprise a collaboration application identifier associated with the collaboration application and a domain group identifier associated with the collaboration domain group.

4. The system of claim 1, wherein the collaboration application comprises one of a platooning application and a lane changing application.

5. The system of claim 1, wherein the first vehicle data comprises real time vehicle data.

6. The system of claim 1, wherein upon a determination that buffer space is unavailable at the local data buffer the collaboration controller is configured to:
receive the first vehicle data from a vehicle ECU via an in-vehicle bus at a first time;
broadcast the first collaboration message including the first vehicle data to the collaboration domain group via the HYDIN as real time vehicle data, the second autonomous vehicle being configured to store the first vehicle data at a second application buffer space at the second autonomous vehicle;
receive a third vehicle data in connection with the collaboration application from the vehicle ECU via the in-vehicle bus at a second time;
broadcast a third collaboration message including the third vehicle data to the collaboration domain group via the HYDIN as real time vehicle data, the second autonomous vehicle being configured to store the third vehicle data at the second application buffer space at the second autonomous vehicle; and
receive a fourth collaboration message comprising the first and third vehicle data at a third time, the fourth collaboration message being broadcast by the second autonomous vehicle to the collaboration domain group via the HYDIN at a third time as historical vehicle data associated with the first autonomous vehicle.

7. The system of claim 1, further comprising a resource identification module at the first autonomous vehicle, the resource identification module configured to:
determine whether at least one collaboration message has been received from each of the autonomous vehicles in the collaboration domain group via the HYDIN during a pre-defined period of time;
generate a collaboration domain group list associated with the collaboration domain group based at least in part on the determination; and
broadcast a fifth collaboration message comprising the collaboration domain group list to the collaboration domain group via the HYDIN.

8. A non-transitory computer readable medium comprising instructions stored thereon for implementing autonomous vehicle collaboration that upon execution by a processor, cause the processor to:
broadcast a first collaboration message comprising first vehicle data associated with a first autonomous vehicle in connection with a collaboration application from the first autonomous vehicle to a collaboration domain group via a hybrid distributed-connected network (HYDIN), the collaboration domain group including at least the first autonomous vehicle and a second autonomous vehicle;
receive a second collaboration message comprising second vehicle data associated with the second autonomous vehicle in connection with the collaboration application via the HYDIN at the first autonomous vehicle, the second collaboration message being broadcast from the second autonomous vehicle to the collaboration domain group via the HYDIN; and
implement a collaboration action associated with the collaboration application at the first autonomous vehicle based at least in part on the first and second vehicle data;
determine whether buffer space is available at a local data buffer of the first autonomous vehicle;
allocate a first application buffer space in the local data buffer for the collaboration domain group in connection with the collaboration application based on the determination, wherein when it is determined that buffer space is unavailable at the local data buffer, cause the processor to:
receive the first vehicle data from a vehicle ECU via an in-vehicle bus at a first time;
broadcast the first collaboration message including the first vehicle data to the collaboration domain group via the HYDIN as real time vehicle data, the second autonomous vehicle being configured to store the first vehicle data at a second application buffer space at the second autonomous vehicle;

receive a third vehicle data in connection with from the vehicle ECU via the in-vehicle bus at a second time;

broadcast a third collaboration message including the third vehicle data to the collaboration domain group via the HYDIN as real time vehicle data, the second autonomous vehicle being configured to store the third vehicle data at the second application buffer space at the second autonomous vehicle; and receive a fourth collaboration message comprising the first and third vehicle data at a third time, the fourth collaboration message being broadcast by the second autonomous vehicle to the collaboration domain group via the HYDIN at a third time as historical vehicle data associated with the first autonomous vehicle.

9. The non-transitory computer readable medium of claim 8, further comprising instructions that upon execution by the processor cause the processor to broadcast the first collaboration message from the first autonomous vehicle to the collaboration domain group via the HYDIN, the first collaboration message comprising, the first vehicle data, a collaboration application identifier associated with the collaboration application, and a domain group identifier associated with the collaboration domain group.

10. The non-transitory computer readable medium of claim 8, further comprising instructions that upon a determination that buffer space is available at the local data buffer and upon execution by the processor cause the processor to:

receive the first vehicle data from a vehicle electronic control unit (ECU) via an in-vehicle bus at a first time and store the first vehicle data at the first application buffer space;

broadcast the first collaboration message including the first vehicle data to the HYDIN as real time vehicle data;

receive a third vehicle data in connection with the collaboration application from the vehicle ECU via the in-vehicle bus at a second time and store the third vehicle data at the first application buffer space;

broadcast a third collaboration message comprising the third vehicle data to the collaboration domain group via the HYDIN as real time vehicle data;

retrieve the first and third vehicle data from the first application buffer space; and broadcast a fourth collaboration message comprising the first vehicle data and the third vehicle data at a third time as historical vehicle data.

11. The non-transitory computer readable medium of claim 8, further comprising instructions that upon execution by the processor cause the processor to:

determine whether at least one collaboration message has been received from each of the autonomous vehicles in the collaboration domain group at the first autonomous vehicle via the HYDIN during a pre-defined period of time;

generate a collaboration domain group list associated with the collaboration domain group based at least in part on the determination; and broadcast a fifth collaboration message comprising the collaboration domain group list to the collaboration domain group via the HYDIN.

12. A method of implementing an autonomous vehicle collaboration comprising:

broadcasting a first collaboration message comprising first vehicle data associated with a first autonomous vehicle in connection with a collaboration application from the first autonomous vehicle to a collaboration domain group via a hybrid distributed-connected network (HYDIN), the collaboration domain group including at least the first autonomous vehicle and a second autonomous vehicle;

receiving a second collaboration message comprising second vehicle data associated with the second autonomous vehicle in connection with the collaboration application via the HYDIN at the first autonomous vehicle, the second collaboration message being broadcast from the second autonomous vehicle to the collaboration domain group via the HYDIN; and implementing a collaboration action associated with the collaboration application at the first autonomous vehicle based at least in part on the first and second vehicle data determining whether buffer space is available at a local data buffer of the first autonomous vehicle;

allocating a first application buffer space in the local data buffer for the collaboration domain group in connection with the collaboration application based on the determination upon a determination that buffer space is available at the local data buffer, the method further comprises:

receiving the first vehicle data from a vehicle electronic control unit (ECU) via an in-vehicle bus at a first time and storing the first vehicle data at the first application buffer space;

broadcasting the first collaboration message including the first vehicle data to the HYDIN as real time vehicle data;

receiving a third vehicle data in connection with the collaboration application from the vehicle ECU via the in-vehicle bus at a second time and storing the third vehicle data at the first application buffer space;

broadcasting a third collaboration message comprising the third vehicle data to the collaboration domain group via the HYDIN as real time vehicle data;

retrieving the first and third vehicle data from the first application buffer space; and broadcasting a fourth collaboration message comprising the first vehicle data and the third vehicle data at a third time as historical vehicle data.

13. The method of claim 12, wherein broadcasting the first collaboration message comprising the first vehicle data, comprises broadcasting the first collaboration message comprising the first vehicle data, a collaboration application identifier associated with the collaboration application, and a domain group identifier associated with the collaboration domain group.

14. The method of claim 12, that upon a determination that buffer space is unavailable at the local data buffer further comprises:

receiving the first vehicle data from a vehicle ECU via an in-vehicle bus at a first time;

broadcasting the first collaboration message including the first vehicle data to the collaboration domain group via the HYDIN as real time vehicle data, the second autonomous vehicle being configured to store the first vehicle data at a second application buffer space at the second autonomous vehicle;

receiving a third vehicle data in connection with the collaboration application from the vehicle ECU via the in-vehicle bus at a second time;

broadcasting a third collaboration message including the third vehicle data to the collaboration domain group via the HYDIN as real time vehicle data, the second autonomous vehicle being configured to store the third vehicle data at the second application buffer space at the second autonomous vehicle; and receiving a fourth collaboration message comprising the first and third vehicle data at a third time, the fourth collaboration message being broadcast by the second autonomous vehicle to the collaboration domain group via the HYDIN at the third time as historical vehicle data associated with the first autonomous vehicle.

* * * * *